United States Patent [19]

Airhart

[11] Patent Number: 4,660,675
[45] Date of Patent: Apr. 28, 1987

[54] VIBRATORY SEISMIC SOURCE FOR GENERATING COMBINED COMPRESSIONAL AND SHEAR WAVES

[75] Inventor: Tom P. Airhart, Plano, Tex.
[73] Assignee: Atlantic Richfield Company, Los Angeles, Calif.
[21] Appl. No.: 826,753
[22] Filed: Feb. 6, 1986
[51] Int. Cl.⁴ .............................................. G01V 1/02
[52] U.S. Cl. ................................... 181/113; 181/121; 181/114; 367/189
[58] Field of Search .................. 367/189, 190, 75; 181/113, 114, 119, 121, 401

[56] References Cited

U.S. PATENT DOCUMENTS 3,282,372  11/1966  Brown et al. ...................... 181/121
4,059,820  11/1977  Turpening ........................... 181/113
4,316,521  2/1982  Chelminski ......................... 181/114
4,321,981  3/1982  Waters ................................ 181/119

Primary Examiner—Charles T. Jordan
Assistant Examiner—John W. Eldred
Attorney, Agent, or Firm—Robert M. Betz

[57] ABSTRACT

A vibratory seismic surface source includes a single vibrating mass, supported above and independently of an earth-contacting base plate. Means are provided for varying the inclination and azimuth of the vibrator axis. After the vibrator is oriented in any desired direction, it is then lowered along its vibratory axis so that it bears directly against the hemispherically concave upper surface of the base plate. When the vibrator is actuated in this position of contact, any desired combination of compressional and shear waves, both SH and SV type, may be generated and recorded simultaneously at a point on the earth's surface remote from the source.

8 Claims, 7 Drawing Figures

VIBRATORY SEISMIC SOURCE FOR GENERATING COMBINED COMPRESSIONAL AND SHEAR WAVES

BACKGROUND OF THE INVENTION

1. Field of the Invention

This invention relates generally to the field of seismic exploration and more particularly to an improved apparatus for imparting vibrational energy to the earth wherein selected combinations of compressional and shear wave energy can be generated simultaneously.

2. Description of the Prior Art

Recent advances in the ability of seismic data acquisition and processing equipment to handle large amounts of data have stimulated greater interest in the development of versatile high energy seismic sources adapted to produce both compressional and shear waves. One goal in the development of "multi-component" seismic sources is to enable the operator to more efficiently measure subsurface formation properties such as porosity, fracture orientation, pore fluid type or lithologic type. It is known that P, SH and SV waves travel with their own distinct velocities when passing through a particular geologic formation. Thus, changes in formation properties, such as rock type, porosity and the like may be detectable by changes in the full wave field (i.e., the P, SV and SH wave velocities). A strong correlation observed between lateral variations and the compressional to shear wave velocity ratio ($V_p/V_s$) with known changes in a geologic formation suggests that these variations may be used to infer changes in the lithology, porosity or pore fluid content of a subsurface formation. By recording the full wave form of a seismic wave, including P, SV and SH waves, one can get far more detailed information concerning rock properties at depth than would otherwise be possible.

In applicant's co-pending commonly assigned U.S. patent application, Ser. No. 792,531 filed on Oct. 29, 1985, in the name of Tom P. Airhart entitled "Full Wave Field Vibratory Seismic Source", there is described an apparatus for coupling vibratory energy into the earth at a given seismic source point. As described in the subject application, a hydraulic vibrator is mounted on an earth-contacting base plate by means of a fixture which enables a rotation of the vibrator axis about two mutually perpendicular axes. Rotation about these two axes permits the operator to position the vibrator axis in any desired direction with respect to a seismic survey line. Energizing the vibrator then transfers energy through the mounting fixture to the base plate and thence into the ground in the preselected direction. Orthogonal 3-element geophones positioned remotely from the seismic source point along the seismic survey line may receive and record simultaneously the resultant P, SH and SV waves, thus enabling full wave field analysis of the sub-surface reflections.

SUMMARY OF THE INVENTION

The present invention contemplates a further improvement in the means for coupling the energy of a single vibrating mass into the earth. The preferred embodiment of this invention comprises a vibrator supported above and independently of an earth contacting base plate. Means are provided for varying the inclination and azimuth of the vibratory axis along which reciprocal vibrations are generated so as to coincide with any predetermined direction. Further means are provided for lowering the vibrator so that it contacts and maintains downward pressure upon the base plate in such predetermined direction. Operation of the vibrator in such contact position enables simultaneous injection of compressional and shear waves, both SH and SV type into the earth in desired proportion. In a more limited aspect, the invention comprises a variably orientable vibrator mounted upon a turntable which may be carried on the bed of a transport vehicle. Hydraulic cylinders mounted on the turntable may be adjustably connected to and vary the inclination of the vibrator with respect to a vertical direction. Vibrator azimuth may be varied by rotation of the turntable such as by motor means. By further hydraulic means adjustably interconnected between the vibrator and the turntable, the vibrator may be lowered until it makes contact with an upper surface of the base plate, such surface being contoured so that it is always perpendicular to the path of the vibratory axis of the vibrator at the point of contact between such vibrator and such surface. Sufficient downward pressure is exerted on the vibrator so that such contact is rigidly maintained when the vibrator is actuated. Seismic energy will thereby be imparted to the earth along the path of such vibratory axis, and hence, in the predetermined direction.

It is therefore a general object of the present invention to provide an apparatus for the simultaneous generation of compressional and shear waves by means of the vibrational energy of a single vibrating mass.

It is a more particular object of the present invention to provide such an apparatus which is readily adaptable to vehicle transport.

It is a still further object of the present invention to provide such an apparatus in which transfer of vibrational energy to an earth contacting base plate is accomplished so as to facilitate substitution of base plates of differing construction and configuration.

Other objects and advantages of the present invention will become apparent from a consideration of the following detailed description taken in conjunction with the accompanying drawings.

DETAILED DESCRIPTION OF THE PREFERRED EMBODIMENT

Figure 1:
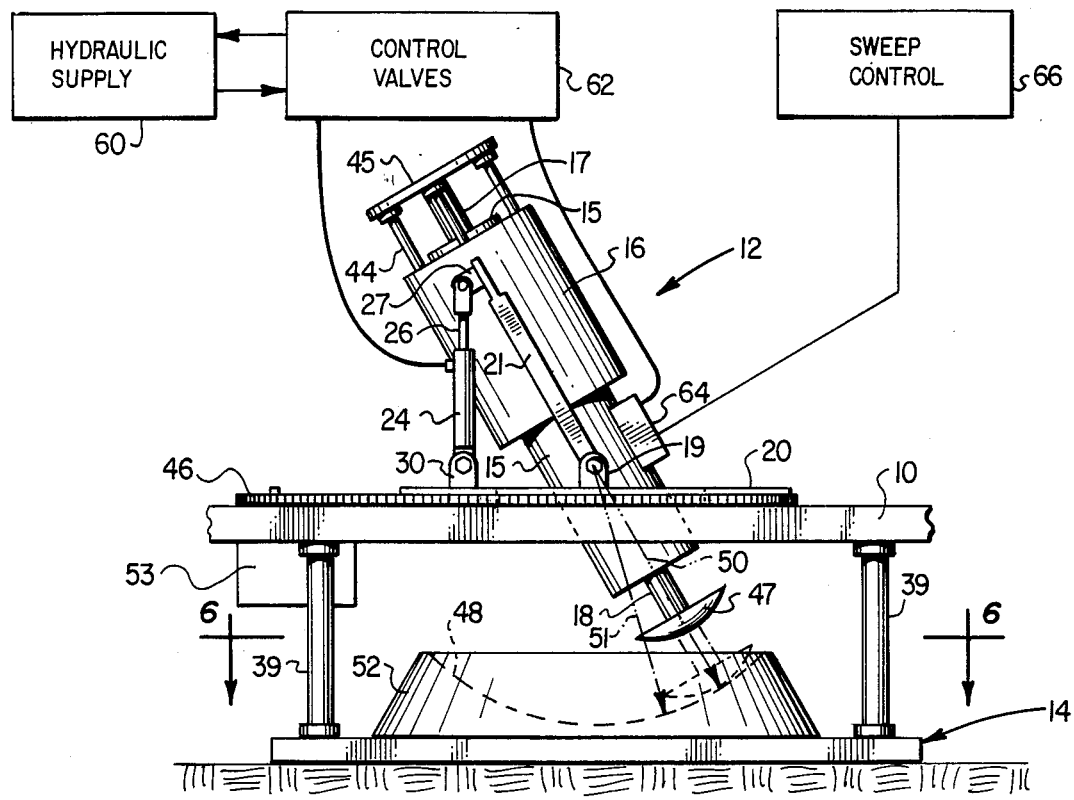
FIG. 1 is an elevational side view in accordance with the preferred embodiment of this invention illustrating a vehicle mounted vibratory seismic source positioned above a suitably contoured earth-contacting base plate.

With respect generally now to FIG. 1, there is illustrated a portion of the bed 10 of a transport vehicle (not shown) upon which is mounted a conventional seismic vibrator 12 so that it is supported above and independently of an earth contacting base plate 14. Vibrator 12 generally comprises a reaction mass 15 mounted for reciprocal motion on a double rod end piston (not shown) having upper rod end 17 and lower rod end 18. As mass 15 moves up and down responsive to the introduction of hydraulic pressure within vibrator 12, the reaction forces on the piston cause corresponding movement of rod ends 17 and 18. Vibrators such as vibrator 12 are fully described and shown in U.S. Pat. No. 3,159,233 issued to Clynch, et al on Dec. 1, 1964 and in related patents. The apparatus to be described hereafter provides means for variably orienting the vibrational axis of vibrator 12 and for then lowering it with respect to its mounting support so that it bears downwardly upon base plate 14. Actuation of vibrator 12 while such contact is firmly maintained transfers vibrational energy to the earth through base plate 14.

Vibrator 12 is supported for limited axial movement within and relative to a cylindrical outer housing 16 by means of which vibrator 12 is interconnected with bed 10. Housing 16 is provided with a pair of external pivot arms 21, the upper ends of which are welded or otherwise secured to the external surface of housing 16. The lower ends of pivot arms 21 are rendered rotatable within lugs 19 fixed to the top of turntable 20, which in turn rests upon bed 10.

Figure 2:
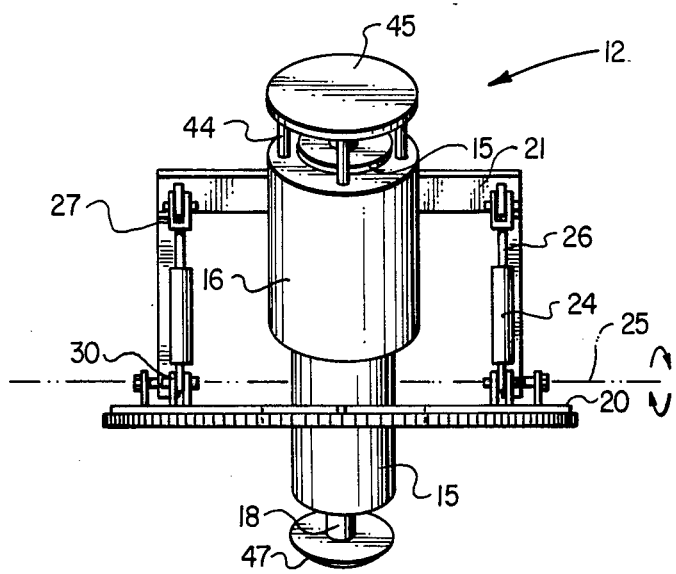
FIG. 2 is a detailed elevation of the apparatus of FIG. 1 seen from the front of the transporting vehicle.

Working in cooperation with pivot arms 21 are a pair of hydraulic cylinders 24 situated on either side of vibrator 12, as best seen with additional reference to FIG. 2. The upper ends of piston rods 26 of cylinders 24 terminate in pivot brackets 27 respectively affixed to pivot arms 21. The lower ends of cylinders 24 are pivotably attached to lugs 30, which are in turn secured to turntable 20. It is apparent that the operation of cylinders 24 in conjunction with the rotation of pivot arms 21 about horizontal axis 25 enables one to vary the inclination of the vibrational axis of vibrator 12 with respect to a vertical direction.

Figure 3:
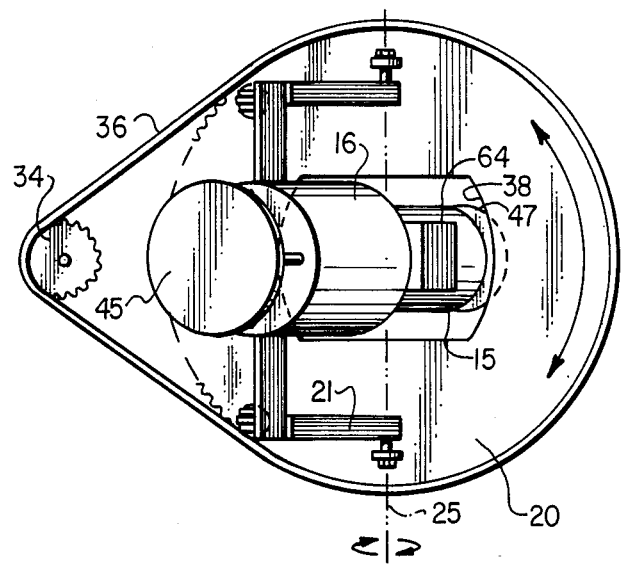
FIG. 3 is a detailed top plan view of the apparatus of FIG. 1 illustrating the rotatable table upon which the vibrator of FIG. 1 is mounted.

Referring additionally to FIG. 3, operation of hydraulic motor 33 rotates drive gear 34 which, through chain 36, provides rotation means for turntable 20. This enables rotation of the vibratory axis of vibrator 12 to any desired azimuth. Turntable 20 contains a central aperture 38, through which vibrator 12 extends and which permits contact between the lower rod end 18 and the base plate 14 in a manner to be described below.

Turntable 20 is secured to truck bed 10 in any suitable manner so as to permit rotation about its center, but so as also to prevent vertical separation from truck bed 10. This is important because in operation upward forces are exerted upon outer housing 16 of vibrator 12 and hence, upon turntable 20 itself. In order to avoid imparting vibration to the entire vehicle, turntable 20 should also be separated from bed 10 by a rubber cushion (not shown) or other suitable shock isolation means well known to the art.

In order to at least partially shift the weight of the transport vehicle from its elastic suspension so as to rest upon base plate 14, four adjustable shock isolated support members 39 may be positioned between base plate 14 and truck bed 10. This serves to stabilize base plate 14 so that it does not slip in a lateral direction when subjected to non-vertical vibratory forces.

Figure 4:
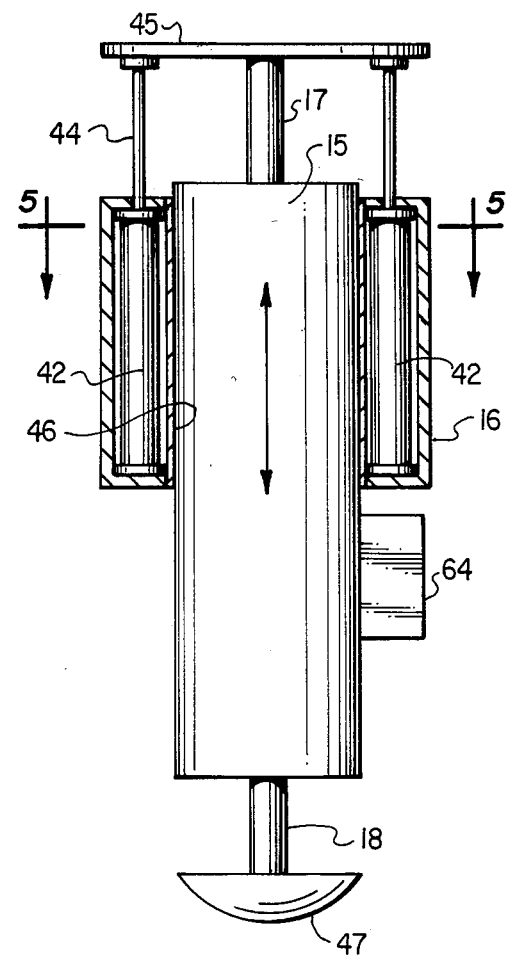
FIG. 4 is a detailed vertical elevation of the vibrator of FIG. 1 with its cylindrical outer housing shown in section.
Figure 5:
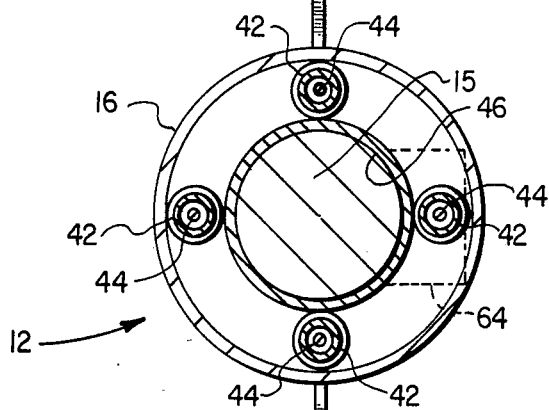
FIG. 5 is a sectional view taken along the line 5—5 in FIG. 4.

As best seen FIGS. 4 and 5, a plurality of hydraulic cylinders 42 (of which four are shown for illustrative purposes) are mounted in the annular space between vibrator 12 and outer housing 16 so that their piston rod ends 44 extend upwardly and are secured to the underside of transverse circular flange 45 spaced above the top of outer housing 16. By operating hydraulic cylinders 42, piston rod ends 44 may be retracted, thus urging vibrator 12 slidably downward within bore 46 until rounded cap 47 affixed to the bottom of lower rod end 18 makes contact with the hemispherically concave upper surface 48 of base plate 14. This readies the apparatus for activation of vibrator 12 along any preselected path. If a new vibrator path is desired or if a different location is desired for seismic operation, cylinders 42 are operated to re-extend piston rods 44 upwardly so as to retract vibrator 12.

The length of travel of piston rods 44 required to effect contact between cap 47 and base plate surface 48 is such that clearance remains between flange 45 and the top of cylindrical housing 16. Thus, after contact is made with surface 48, additional force may easily be exerted through cylinders 42 to apply downward pressure against surface 48. Upward reaction to such pressure transmitted to turntable 20 through outer housing 16 is resisted by the weight of the carrying vehicle. In this way, sufficient force can readily be applied to maintain firm contact between cap 47 and surface 48 during operation of vibrator 12. This prevents any unwanted "bounce" of vibrator 12 or impulsive impacts against surface 48. In this way base plate 14 may faithfully reproduce the reciprocal vibratory motion of vibrator 12 when it is actuated in its lower operative position.

Figure 6:
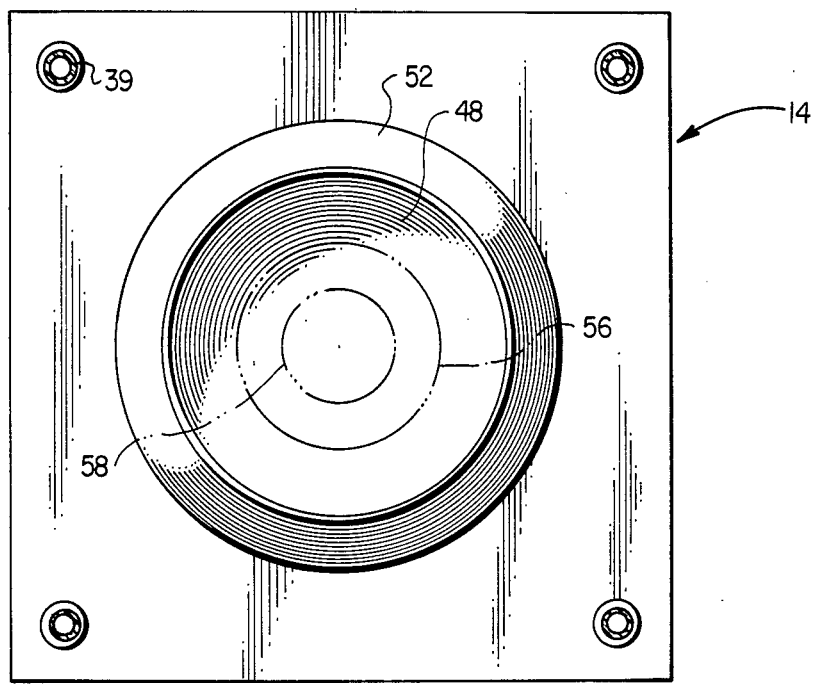
FIG. 6 is a top plan view taken along the line 6—6 in FIG. 1.

With particular reference to FIG. 6, upper contact surface 48 of base plate 14 is formed upon a frusto-conical elevation 52. Surface 48 is constructed as a portion of a sphere whose center lies on the horizontal axis of rotation 25 of pivot arms 18. This insures that the path followed by the vibrator axis of vibrator 12 will always be perpendicular to surface 48 at the point of contact. Thus, the direction of the resultant energy injection into the earth will be substantially the same as the path along which the vibratory axis of vibrator 12 is oriented. For any preselected inclination of vibrator 12, rotation of turntable 20 will effect a contact between cap 47 and surface 48 at some point along a circular path. For example, if vibrator 12 is inclined along vibrator path 50, rotation of turntable 20 will produce contact between cap 47 and surface 48 at some point along a circular path such as circle 56. If one shifts the inclination of vibrator 12 to a path 51 closer to the vertical (FIG. 1), rotation of turntable 20 will establish contact at a point along a different circular path such as circle 58. But the perpendicularity between the path of the vibratory axis of vibrator 12 and surface 48 always remains the same.

In operating the apparatus of this invention, frequency and sweep rate control of vibrator 12 may be accomplished in a manner well known to those skilled in this art utilizing hydraulic supply 60 and control valve 62. Servo valves 64 may then be operated by signals from sweep control 66 so as to provide reciprocation of reaction mass 15 within vibrator 12 and produce corresponding vibrational motion of base plate 14 for coupling into the earth.

Figure 7:
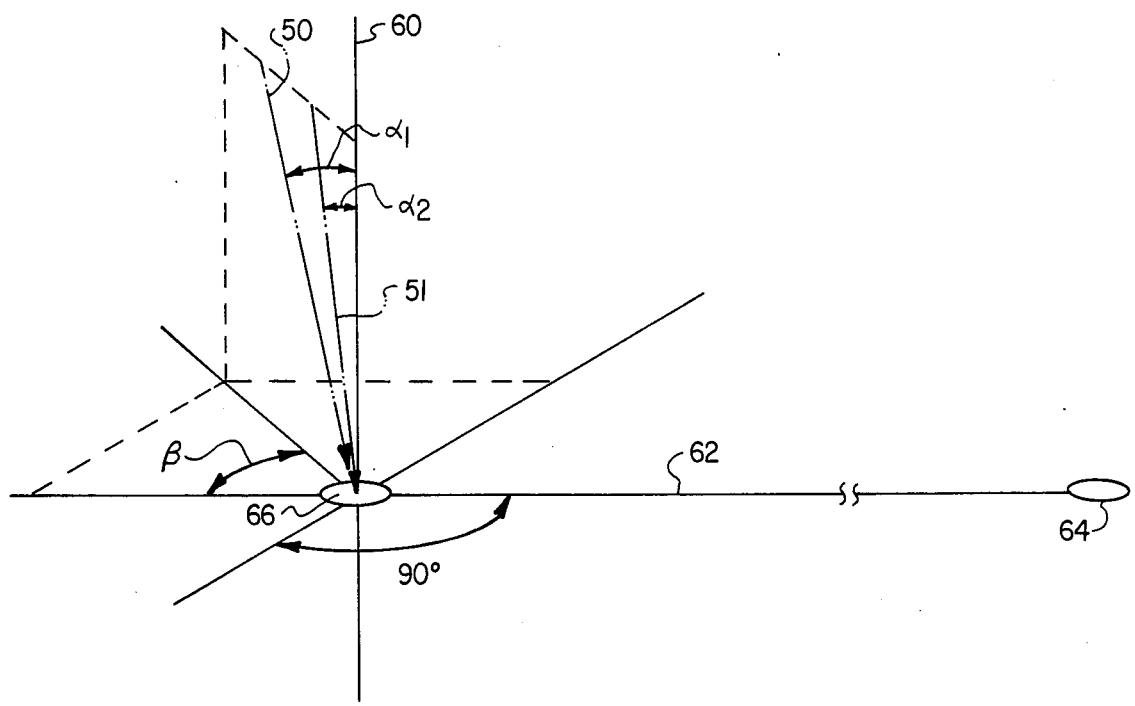
FIG. 7 is a diagrammatic 3-dimensional representation of a vibratory seismic wave being injected into the earth by the apparatus of this invention along a path of predetermined inclination and azimuth as related to a seismic line leading to a remote 3-element geophone.

The mode of use of this invention can be better understood by reference to FIG. 7 which diagmatically illustrates the inclination and azimuth of typical paths of the vibratory axis of vibrator 12. For example, the previously discussed paths 50 and 51 may give rise to angles of inclination $\alpha_1$ and $\alpha_2$, respectively, with respect to a vertical direction 60. Rotation of the vibratory axis may be such as to produce an azimuthal angle $\beta$ with respect to a seismic line 62. In this way, a 3-element seismometer 64 located remote from seismic source point 66 along seismic line 62 may record simultaneously, any desired combination of P, SH and SV waves.

The foregoing discloses a seismic vibrator of novel construction utilizing a single vibrating mass whose inclination and azimuth may readily be varied without moving the transport vehicle and without the use of base plate mounting equipment. It should be emphasized, of course, that any suitable rigid platform or frame may be employed to support vibrator 12 and its associated equipment, whether or not forming part of an on or off-road vehicle. In any event, utilization of the vibrator of this invention effects transfer of energy directly to the base plate without the intervention of any attenuating linkage. It should be further understood that the particular form of vibrator and base plate described in this application, as well as the means for adjustment of the vibratory axis of vibrator 12, are illustrative only, and not to be regarded in any sense as limiting the scope of the apparatus of this invention as more particularly set forth in the appended claims.

What is claimed is:

1. Apparatus for imparting combined compressional and shear wave seismic vibratory signals to the earth comprising:
   (a) an earth-contacting base plate for coupling vibrational energy into the earth;
   (b) vibrator means for producing reciprocal vibrations along a vibratory axis oriented in a predetermined direction, said vibrator means being supported above and independently of said base plate, in spaced relation thereto;
   (c) means for bringing said vibrator means into a position of contact with said base plate; and
   (d) control means for activation of said vibrator means in said position of contact with said base plate, whereby vibrations in said predetermined direction are transferred to said base plate for injection into the earth.

2. Apparatus for imparting combined compressional and shear wave seismic vibratory signals to the earth comprising:
   (a) an earth-contacting base plate for coupling vibrational energy into the earth;
   (b) vibrator means for producing reciprocal vibrations along a vibratory axis, said vibrator means being supported above and independently of said base plate in spaced relation thereto;
   (c) means for varying the inclination and azimuth of said vibratory axis so as to coincide with a predetermined direction;
   (d) means for thereafter bringing said vibrator means into a position of contact with said base plate; and
   (e) control means for actuation of said vibrator means in said position of contact whereby vibrations in said predetermined direction are transferred to said base plate for injection into the earth.

3. Apparatus as in claim 2 additionally including means for applying a constant biasing force along said vibratory axis adapted to urge said vibrator means against said base plate.

4. Apparatus as in claim 2 wherein said vibrator means is a hydraulic vibrator having an upper and a lower end between which said vibratory axis extends and wherein said lower end is adapted to make contact with said base plate.

5. Apparatus as in claim 4 wherein said base plate is provided with an upwardly facing surface which said lower end of said vibrator is adapted to contact, said surface being contoured such that the path of said vibratory axis remains substantially perpendicular to said surface at the point of intersection of said path and said surface.

6. Apparatus for imparting combined compressional and shear wave seismic vibratory signals to the earth comprising:
   (a) an earth-contacting base plate for coupling vibratory energy into the earth;
   (b) vibrator means for producing reciprocal vibrations along a vibratory axis;
   (c) a hollow cylindrical outer housing provided with a longitudinal bore having at least one open end facing with a longitudinal bore having at least one open end facing said base plate, said vibratory means being slidably supported within said bore so that said vibratory axis coincides with the axis of said bore;
   (d) a rotatable platform positioned above said base plate in fixed vertical relation thereto, said outer housing being mounted on said platform so that clearance is provided between said vibrator means and said base plate;
   (e) means adjustably secured between said platform and said outer housing for pivoting said outer housing about a horizontal axis;
   (f) means for rotating said platform so as to vary the azimuthal heading of the axis of said bore;
   (g) means adjustably secured between said outer housing and said vibrator means for urging said vibrator means along said bore in the direction of said open end so as to contact said base plate; and
   (h) control means for actuation of said vibrator means in said position of contact whereby vibrations along said vibratory axis are transferred to said base plate for injection into the earth.

7. Apparatus as in claim 6 wherein said means for urging said vibrator means downwardly comprises hydraulic cylinder means fixed to said outer housing and having piston rod means fixed to said outer housing and having piston rod means extended in engagement with said vibrator means such that movement of said piston rod means varies the axial position of said vibrator means relative to said bore.

8. Apparatus as in claim 7 wherein said hydraulic cylinder means is a plurality of parallel spaced-apart hydraulic cylinders whose respective piston rods extend coaxially with said bore, said vibrator means having a transverse circular flange adapted to be engaged by the ends of said piston rods.

* * * * *

UNITED STATES PATENT OFFICE
CERTIFICATE OF CORRECTION

PATENT NO. : 4,660,675
DATED : April 28, 1987
INVENTOR(S) : Tom P. Airhart

It is certified that error appears in the above-identified patent and that said Letters Patent are hereby corrected as shown below:

On the last page, column 6, line 28, after the word "facing" delete "with a longitudinal bore having at least one open end facing".

Signed and Sealed this

Twenty-first Day of June, 1988

Attest:

DONALD J. QUIGG

*Attesting Officer*  *Commissioner of Patents and Trademarks*